(12) United States Patent
Milani et al.

(10) Patent No.: US 12,038,102 B2
(45) Date of Patent: Jul. 16, 2024

(54) FLUID-DYNAMIC DEVICE WITH INTEGRATED SENSOR ELEMENT

(71) Applicant: DOLPHIN FLUIDICS S.R.L., Corsico (IT)

(72) Inventors: Paolo Milani, Pavia (IT); Tommaso Santaniello, Milan (IT); Lorenzo Migliorini, Milan (IT); Diego Andreis, Milan (IT); Francesco Butera, Arese (IT)

(73) Assignee: DOLPHIN FLUIDICS S.R.L., Corsico (IT)

( * ) Notice: Subject to any disclaimer, the term of this patent is extended or adjusted under 35 U.S.C. 154(b) by 89 days.

(21) Appl. No.: 17/859,371

(22) Filed: Jul. 7, 2022

(65) Prior Publication Data
US 2023/0011112 A1     Jan. 12, 2023

(30) Foreign Application Priority Data
Jul. 12, 2021    (IT) .................. 102021000018260

(51) Int. Cl.
*F16K 37/00*     (2006.01)
*F16K 7/14*     (2006.01)
(Continued)

(52) U.S. Cl.
CPC ............ *F16K 37/0041* (2013.01); *F16K 7/14* (2013.01); *G01L 19/0092* (2013.01); *G01N 27/06* (2013.01)

(58) Field of Classification Search
CPC . G01L 19/0092; G01N 27/06; F16K 37/0041; F16K 7/14; Y10T 137/776
See application file for complete search history.

(56) References Cited

U.S. PATENT DOCUMENTS 6,182,941 B1 *   2/2001   Scheurenbrand ... F16K 99/0051
                                                                                                                            137/554
10,030,789 B2 *   7/2018   Shinohara .............. G01N 27/20
(Continued)

FOREIGN PATENT DOCUMENTS

DE     102018131802 A1    6/2020
EP         3415759 A1    12/2018
(Continued)

OTHER PUBLICATIONS

Translation of WO2014188717A1 retrieved from espacenet.com Nov. 2023 (Year: 2023).*
(Continued)

*Primary Examiner* — Jessica Cahill
(74) *Attorney, Agent, or Firm* — CANTOR COLBURN LLP

(57) ABSTRACT

A fluid-dynamic device with integrated sensor element includes a first chamber suitable for the containment and/or the passage of a fluid, provided with an inlet opening operatively connectable to a fluid-dynamic circuit and configured to allow a fluid to enter the first chamber, and with a separate outlet opening, operatively connectable to a fluid-dynamic circuit and configured to expel said fluid from the first chamber. The first chamber includes at least one portion elastically deformable due to the action of the fluid contained therein and/or passing through the first chamber, to which a sensor element is associated which is sensitive to the deformation of the elastically deformable portion of the first chamber.

20 Claims, 4 Drawing Sheets

(51) Int. Cl.
*G01L 19/00* (2006.01)
*G01N 27/06* (2006.01)

(56) References Cited

U.S. PATENT DOCUMENTS

| | | | |
|---|---|---|---|
| 10,914,698 B2* | 2/2021 | Potyrailo | G01N 33/1893 |
| 2005/0092079 A1* | 5/2005 | Ales | F16K 31/1221 |
| | | | 73/270 |
| 2005/0115402 A1* | 6/2005 | Hembree | F04B 43/0054 |
| | | | 92/96 |
| 2008/0202606 A1* | 8/2008 | O'Hara | F16K 7/123 |
| | | | 137/551 |
| 2015/0168959 A1* | 6/2015 | Sasao | G05D 7/0113 |
| | | | 137/487 |
| 2019/0003609 A1 | 1/2019 | Asai et al. | |
| 2021/0072052 A1 | 3/2021 | Molinazzi et al. | |

FOREIGN PATENT DOCUMENTS

| | | |
|---|---|---|
| WO | 2011121017 A1 | 10/2011 |
| WO | 2014188717 A1 | 11/2014 |
| WO | 2019207468 A1 | 10/2019 |

OTHER PUBLICATIONS

Translation of DE102018131802 retrieved from espacenet.com Nov. 2023 (Year: 2023).*

IT Search Report issued Mar. 25, 2022 re: Application No. IT 202100018260, pp. 1-21, citing: US 2021/0072052 A1, WO 2019/207468 A1, EP 3 415 759 A1, WO 2014/188717 A1, US 2005/0092079 A1, US 2008/0202606 A1, US 2019/0003609 A1 and DE 10 2018 131802 A1.

* cited by examiner

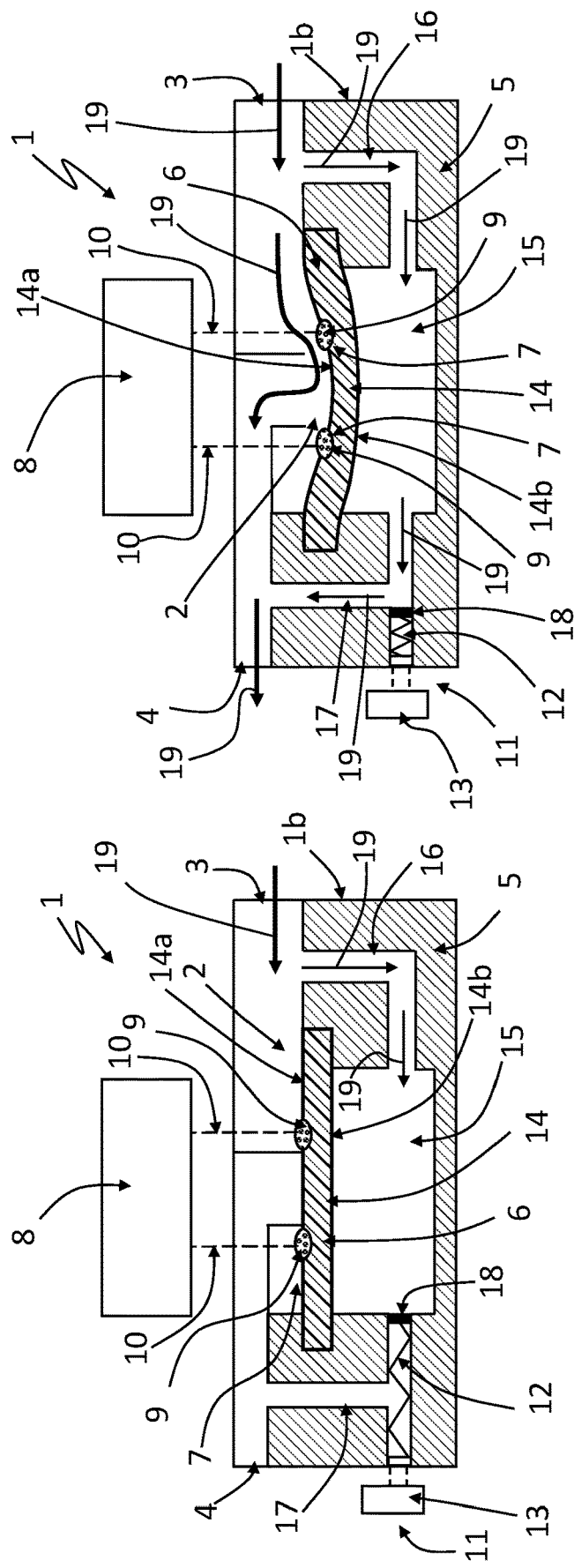

FLUID-DYNAMIC DEVICE WITH INTEGRATED SENSOR ELEMENT

CROSS-REFERENCE TO RELATED APPLICATIONS

This application is related to and claims the benefit of Italian Patent Application No. 102021000018260, filed on Jul. 12, 2021, the contents of which are herein incorporated by reference in their entirety.

TECHNICAL FIELD

The present disclosure refers to a fluid-dynamic device with integrated sensor element.

BACKGROUND

Nowadays, fluid-dynamic circuits are known, e.g. hydraulic circuits of machinery, such as for example automatic machines for the production of coffee, household appliances, etc., which comprise a plurality of devices or components, such as for example pipes or conduits, valves, pumps, sensors, control units, etc.

In order to measure the pressure of a fluid (a liquid or a gas) contained in or moving in a fluid-dynamic circuit (e.g. in a hydraulic circuit), sensors are known that can detect the pressure of said fluid, and translate it into a signal, generally electrical, which can be read and processed, for example, by an electronic control unit.

The different types of pressure sensors known today differ from one another based on the physical principle they use to detect fluid pressure; for example, strain gauge-based pressure sensors are known to comprise a flexible, pressure-sensitive diaphragm or foil onto which electrically conductive tracks are glued or sprayed, which modify their electrical resistance depending on their deformation state. Such conductive tracks are usually fed through a Wheatstone bridge.

The diaphragm is generally encapsulated in a metal casing, provided with a single access conduit for a fluid, adapted to direct the latter towards the diaphragm, so that the same is subject to the pressure of the fluid.

The pressure acting on the diaphragm results in the mechanical deformation of the same, and therefore of the electrically conductive tracks, which consequently modify their electrical resistance; the pressure can therefore be determined by the variation of the electrical resistance.

Such pressure sensors of a known type are associated with a fluid-dynamic circuit by connecting their access conduit by derivation from said fluid-dynamic circuit, as if they were branches with no exit.

Such strain gauge pressure sensors of a known type have the disadvantage of being stand-alone devices, and do not lend themselves, for example, to constituting or being integrated into other fluid-dynamic devices or components, in order to make the latter able to independently detect the pressure of the fluid contained therein or crossing them.

Moreover, such pressure sensors of a known type are generally relatively bulky and expensive.

SUMMARY

The main task of the present disclosure is therefore to realize a fluid-dynamic device with integrated sensor element that solves the problems of the aforementioned prior art, and in particular that can constitute or be easily integrated within a fluid-dynamic device or component, in order to make the latter able to independently detect a quantity (for example the pressure) associated with the fluid contained therein or crossing it.

In the context of this task, the present disclosure realizes a fluid-dynamic device with integrated sensor element that makes it possible to reduce the overall dimension of a fluid-dynamic circuit to which it is applied.

The disclosure realizes a fluid-dynamic device with integrated sensor element that has a relatively small overall dimension.

The above-mentioned task and purposes are achieved by realizing a fluid-dynamic device with integrated sensor element as set out in claim 1.

Further features of the disclosure are highlighted by the claims dependent on 1.

A further aspect of the disclosure is the method by which the device is used, set forth in claim 15; further advantageous aspects of this method are set forth in the claims dependent on the latter.

BRIEF DESCRIPTION OF THE DRAWINGS

The characteristics and advantages of the fluid-dynamic device with integrated sensor element according to the present disclosure will be more apparent from the following description, which is to be understood as exemplifying and not limiting, with reference to the appended schematic drawings, wherein:

FIG. 5 is a schematic side sectional view of a third embodiment example of a fluid-dynamic device with integrated sensor element according to the present disclosure, implemented as a fluid valve in closed condition;

FIG. 6 is a schematic side sectional view of the fluid-dynamic device of FIG. 4 in the open condition.

DETAILED DESCRIPTION OF THE DRAWINGS

In the accompanying figures, a fluid-dynamic device with integrated sensor element, according to the disclosure, is collectively referred to as 1.

The fluid-dynamic device 1 advantageously comprises a first chamber 2, suitable for the containment and/or the passage of a fluid, such as a liquid.

The first chamber 2 is provided with an inlet opening 3, operatively connectable to a fluid-dynamic circuit, e.g. a hydraulic circuit, not illustrated in the attached figures, and configured to allow a fluid, e.g. a liquid, to enter the first chamber 2.

The first chamber 2 is provided with an outlet opening 4, which is also operatively connectable to a fluid-dynamic circuit, e.g. a hydraulic circuit, not illustrated in the attached figures, the same or a different one with respect to the inlet opening 3, and configured for the expulsion of a fluid from the first chamber 2.

Figure 2:
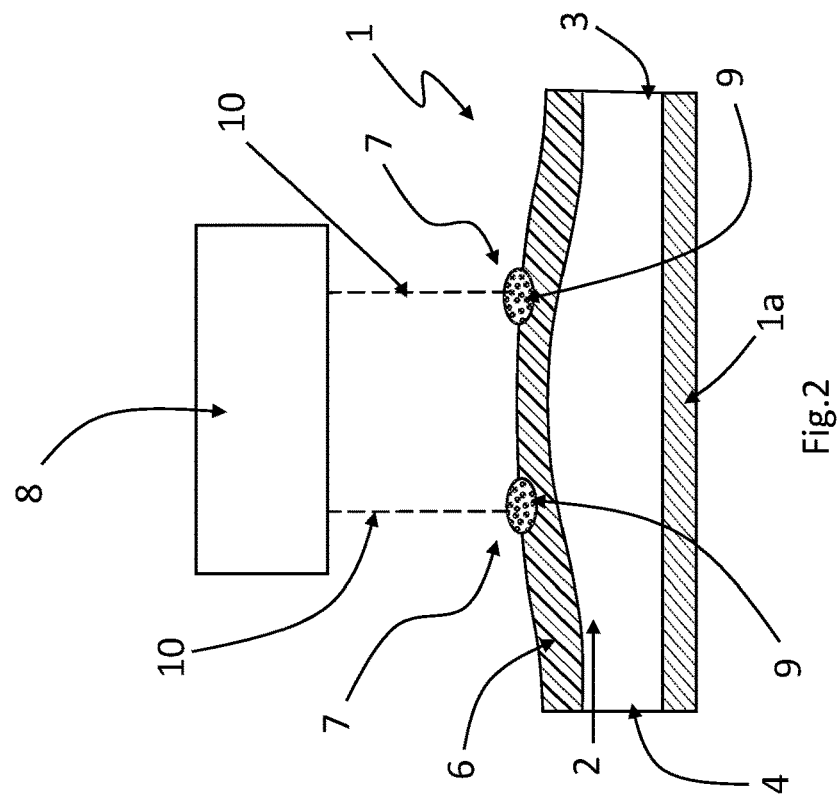
FIG. 2 is a schematic side sectional view of the fluid-dynamic device of FIG. 1 in a second operating condition.
Figure 1:
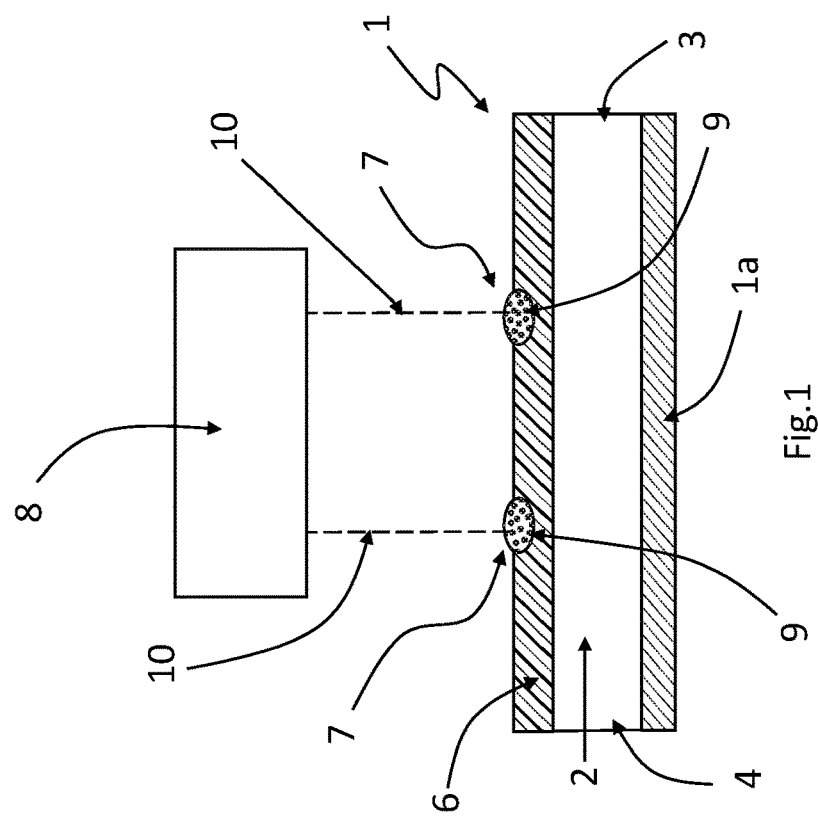
FIG. 1 is a schematic side sectional view of a first embodiment example of a fluid-dynamic device with integrated sensor element according to the present disclosure, in a first operating condition.

In the embodiment example illustrated in FIGS. 1 and 2, the fluid-dynamic device 1 is advantageously implemented as a tubular body 1a, defining the first chamber 2, at the ends of which the inlet opening 3 and the outlet opening 4 are respectively present. Such a tubular element 1a can for example be advantageously used as piping or tubing of a fluid-dynamic circuit.

Advantageously, the tubular body 1a can have a straight configuration, like in FIGS. 1 and 2, or an arcuate one, or any tubular configuration (e.g. partially straight and partially arcuate).

In the embodiment examples of FIGS. 3 and 4, and 5 and 6, the fluid-dynamic device 1 is implemented as a valve 1b, comprising a valve body 5, made for example of plastic, inside which the first chamber 2 is obtained, with its inlet opening 3 and its outlet opening 4.

The first chamber 2 comprises at least one portion 6, elastically deformable due to the action of the fluid contained therein and/or passing through said first chamber 2, to which a sensor element 7 is associated which is sensitive to the deformation of said elastically deformable portion 6.

It is to be noted that the expression "portion 6 elastically deformable due to the action of the fluid contained therein and/or passing through said first chamber 2" means that the portion 6 of the first chamber 2, under the normal operating conditions for which the fluid-dynamic device 1 is configured to operate, has elasticity characteristics such that said portion 6 undergoes, due to the action of the fluid passing through or contained in the first chamber 2 (e.g. because of the pressure of said fluid), macroscopic elastic deformations, and measurable for example by means of a deformation sensor associated with the portion 6 itself.

Advantageously, the elastically deformable portion 6 is or comprises an elastomeric material, preferably one with high electrical resistivity (e.g. in the order of GΩm—Giga Ohm), for example, but not necessarily, an elastomeric material chosen from polysiloxanes (silicone), polyurethane elastomers, elastomeric fluoropolymers, polyolefin-based elastomers, polybutadiene (BR), a styrene-butadiene rubber (SBR), an ethylene-propylene rubber (EPR), an ethylene-propylene-diene rubber (EPDM), a nitrile rubber (NBR), an acrylic rubber (ACM), an isobutylene and isoprene-based rubber (IIR), the polydimethylsiloxane (PDMS).

Advantageously, the sensor element 7 is connected/connectable to a control unit, schematically represented with a rectangle 8, configured to detect a characteristic quantity of the sensor element 7 dependent on the deformation of the elastically deformable portion 6 of the first chamber 2.

Advantageously, the control unit 8 can be integrated into the fluid-dynamic device 1, or the same can be a component external to the latter.

Advantageously, the control unit 8 can be an electronic board, a microcontroller, etc.

Advantageously, the sensor element 7 is or comprises a deposit 9 of functional material whose electrical properties, and in particular whose electrical resistance (and/or impedance and/or capacitance), vary according to its deformation; the deposit 9 is electrically connected to electrical connectors 10, represented in the attached figures with dashed lines, for its connection to the control unit 8.

Advantageously, the electrical resistance of the deposit 9 varies in the order of Q or tens of Q, depending on the degree of deformation.

Advantageously, the deposit 9 of functional material modifies its electrical resistance depending on its degree of deformation; a deformation of the elastically deformable portion 6 results in a corresponding deformation of the deposit 9, and a variation of its electrical resistance, which can be detected by the control unit 8, for example, by supplying an electric current to the deposit 9 through the electrical connectors 10, and detecting the electric voltage generated at the ends of these electrical connectors 10, or by imposing a certain electric voltage, and measuring the generated electric current.

The deposit 9 of functional material can be produced by multiple technologies that allow to obtain materials whose resistance is modified by mechanical deformation.

An advantageous example of a method, applicable for obtaining a fluid-dynamic device 1 according to the present disclosure, for making the deposit 9 of a functional material is the production thereof by the method described in International Patent Application No. WO2011121017 to which reference is made, according to which said functional material is advantageously a nanocomposite material comprising nanoparticles consisting of a metal, an oxide or other compound of a metal deposited by implantation of nanometer-sized neutral aggregates on a surface of an elastomeric material.

In an advantageous embodiment, the deposit 9 made of said nanocomposite material is composed of a first layer of carbon nanoparticles and a second layer of gold nanoparticles.

Preferably, the deposit 9 of functional material is defined by a volume of material consisting of a dispersion of nanoparticles comprising said metal, oxide or other compound of a metal in the matrix of the elastomeric material of the elastically deformable portion 6.

Figure 8:
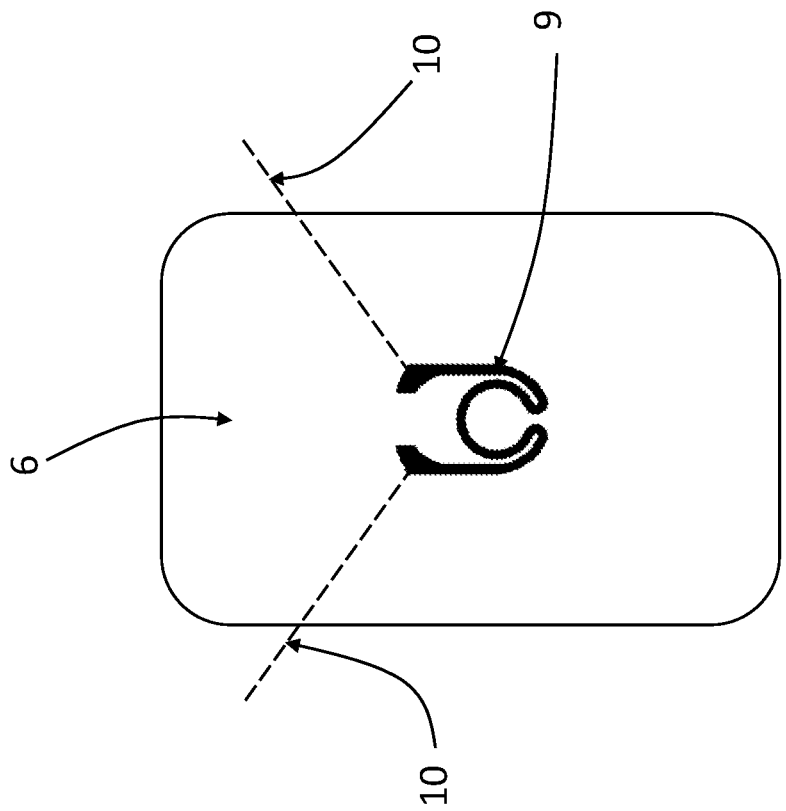
FIGS. 7 and 8 are two schematic plan views of two embodiment examples of the elastically deformable portion of the first chamber of a fluid-dynamic device according to the present disclosure, implemented as a membrane.
Figure 7:
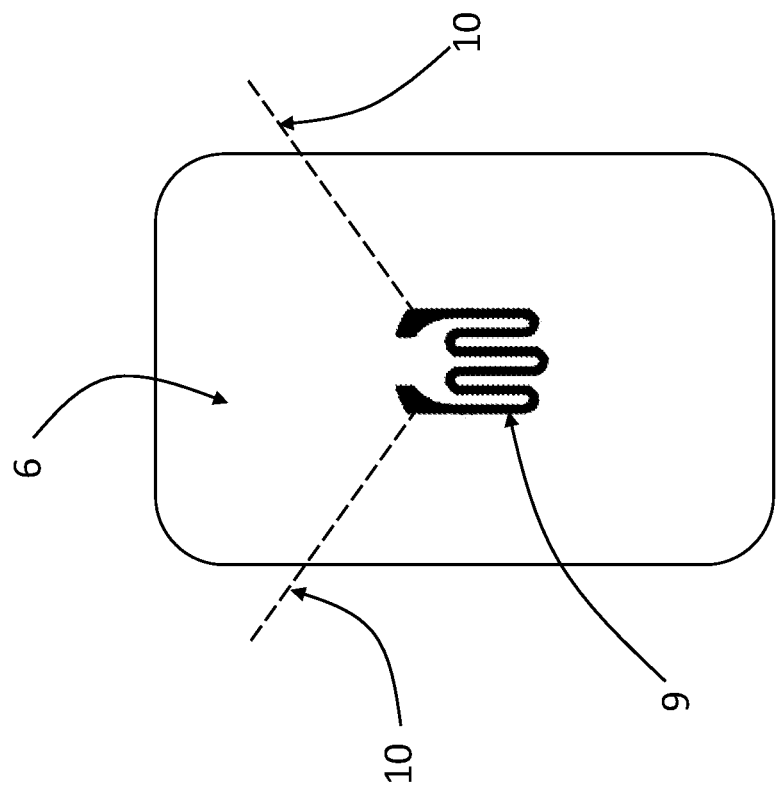

In an advantageous embodiment, such as the one illustrated in FIGS. 7 and 8, the deposit 9 of functional material is arranged on the elastomeric material of the portion 6 so as to define, in plan, a grid-like conformation (two examples of which are illustrated schematically in FIGS. 7 and 8).

Advantageously, the elastically deformable portion 6 of the first chamber 2 is configured to elastically modify its degree of deformation as a function of the pressure of the fluid contained in or transiting in the first chamber 2.

In a further advantageous embodiment, the elastically deformable portion 6 of the first chamber 2 can be configured to elastically modify its degree of deformation as a function of the temperature of the fluid contained in or transiting in the first chamber 2.

In a further advantageous embodiment, the elastically deformable portion 6 of the first chamber 2 can be configured to elastically modify its degree of deformation as a function of the values of a combination of characteristic parameters of the fluid contained in or transiting in the first chamber 2, such as pressure, temperature, flow rate, etc.

In the embodiment example illustrated in FIGS. 1 and 2, the elastically deformable portion 6 is advantageously part of the tubular body 1a, preferably a portion of its lateral surface; in a further advantageous embodiment, not illustrated, the elastically deformable portion 6 may coincide with the entire tubular body 1a. In this case, advantageously, the pressure of a fluid, e.g. a liquid, contained in or transiting in the first chamber 2, elastically deforms the tubular body 1a by a certain amount at the elastically deformable portion 6 thereof.

The sensor element 7 then detects this deformation, and transmits a signal to the control unit 8 depending on the degree of deformation of the portion 5.

Figure 4:
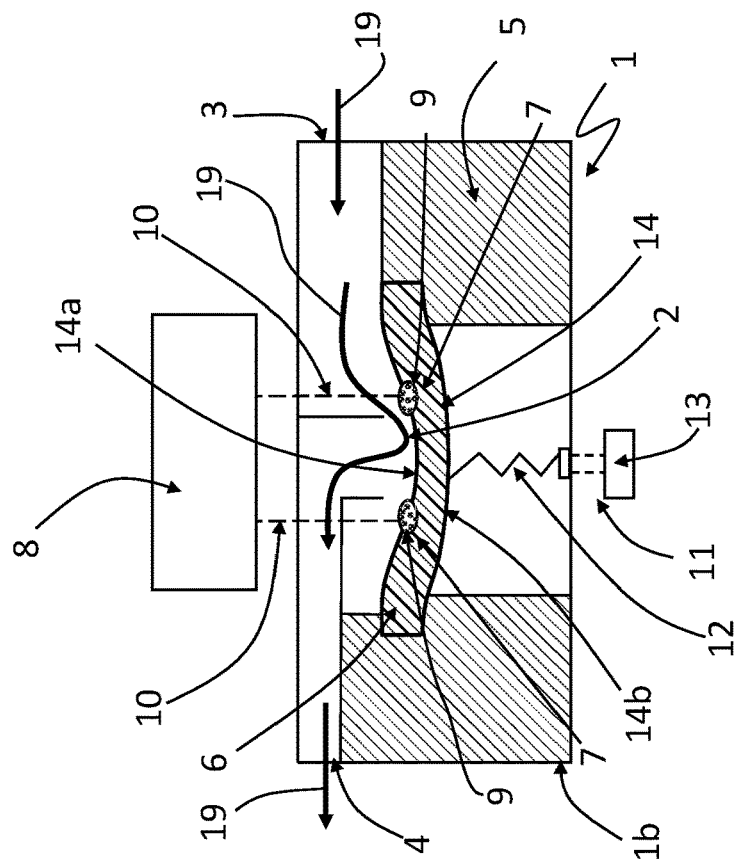
FIG. 4 is a schematic side sectional view of the fluid-dynamic device of FIG. 3 in the open condition.
Figure 3:
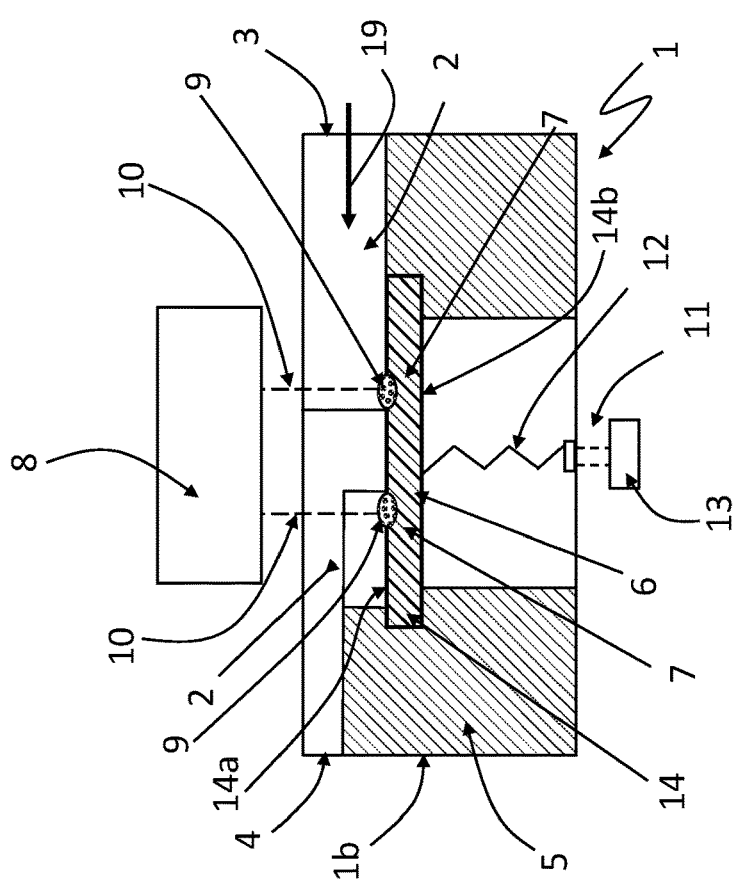
FIG. 3 is a schematic side sectional view of a second embodiment example of a fluid-dynamic device with integrated sensor device according to the present disclosure, implemented as a fluid valve in closed condition.

In the embodiments illustrated in FIGS. 3 and 4, and 5 and 6, wherein the fluid-dynamic device 1 is advantageously a valve 1b, the elastically deformable portion 6 is advantageously configured to be elastically deformable between a closed condition, illustrated for example in FIGS. 3 and 5, in which the same prevents fluid communication between the inlet opening 3 and the outlet opening 4, and an open condition, illustrated for example in FIGS. 4 and 6, in which the same allows fluid communication between the inlet opening 3 and the outlet opening 4.

Advantageously, such as in the embodiments illustrated in FIGS. 3 and 4, and 5 and 6, in the closed condition, the elastically deformable portion 6 is in a state of deformation such that the same completely closes the cross-section, or passage section, of a stretch of the first chamber 2 arranged between the inlet opening 3 and the outlet opening 4, so as to interrupt fluid communication between these openings.

In advantageous embodiments, such as those illustrated in the embodiment examples of FIGS. 3 and 4, and 5 and 6, the fluid-dynamic device 1 advantageously comprises an actuator element 11 configured to selectively bring the elastically deformable portion 6 of the first chamber 2 into the closed condition or into the open condition.

Advantageously, the actuator element is controlled or controllable by the control unit 8.

Advantageously, the elastically deformable portion 6 and the actuator element 11 are configured in such a way that, in the rest condition of the actuator element 11, the elastically deformable portion 6 is, or elastically brings itself, into the closed condition.

In a preferred embodiment, the actuator element 11 comprises an active element 12, made of shape memory material and configured to selectively generate, depending on its shape and/or dimensions, a certain force that causes, directly or indirectly (as will be better explained below), a deformation of the elastically deformable portion 6 of the first chamber 2; the actuator system 11 advantageously comprises an electric current generating device 13, operatively connected to the active element 12 to selectively modify its shape and/or dimensions through a temperature variation induced by the passage of electric current within said active element 12. Preferably, the electric current generator 13 is operatively connected to the control unit 8, so that it can be controlled by it.

In an advantageously embodiment, illustrated for example in FIGS. 3 and 4, and 5 and 6, the elastically deformable portion 6 of the first chamber 2 is or comprises a membrane 14, made of elastomeric material, with an inner face 14a, facing inwardly of the first chamber 2, and an outer face 14b, facing outwardly of the first chamber 2; advantageously, the deposit 9 of functional material is deposited on at least one of the inner face 14a and the outer face 14b (the inner face 14a in the embodiments of FIGS. 3 and 4, 5 and 6).

Advantageously, as in the example embodiment illustrated in FIGS. 3 and 4, the actuator element 11 is operatively connected to the outer face 14b of the membrane 14, and is configured to selectively bring the latter into the closed condition or into the open condition; in the advantageous embodiment illustrated in FIGS. 3 and 4, the active element 12 of the actuator element 11 is made of shape memory material, and is operatively connected to the outer face 14b of the membrane 14, and configured to selectively bring the latter into the closed condition or into the open condition.

In such an advantageous embodiment, the active element 12 is preferably shaped as a torsion spring, more preferably as a helix, constrained at a first end thereof to the outer face 14b of the membrane 14, or to an intermediate element, not represented, which is in turn fixed to said outer face 14b; said torsion spring is also constrained, at a second end thereof, to the valve body 5.

Advantageously, by operating on the electric current generator 13, a desired electric current can be sent to the active element 12, which heats up, changing its dimensions by a desired amount, and thus varying, by a desired amount, the elastic force generated by it, and transmitted to the membrane 14; in this way, the position of the membrane 14 between the closed and open condition can be continuously controlled, and consequently the degree of opening/closing of the valve 1b can be precisely adjusted. In this case, the active element 12 thus directly controls the deformation of the elastically deformable portion 6 (i.e. of the membrane 14) of the first chamber 2. The operation of this embodiment will be explained in more detail below.

In a further advantageous embodiment, such as the one illustrated in FIGS. 5 and 6, the fluid-dynamic device (in this case the valve 1b) comprises a second chamber 15 connected in parallel to the first chamber 2 by means of an injection opening 16, in fluid communication with the inlet opening 3, and by means of an emission opening 17, in fluid communication with the outlet opening 4; in such an advantageous embodiment, the elastically deformable portion 6 (in this case the membrane 14) separates the second chamber 15 from the first chamber 2.

Advantageously, in such an advantageous embodiment, the actuator element 11 is configured to selectively interrupt or allow fluid communication between the second chamber 15 and the outlet opening 4, so as to, respectively, equalize or reduce (as will be better explained below) the pressure of a fluid contained in the second chamber 15 with respect to the pressure of a fluid contained in the first chamber 2.

Advantageously, in such an embodiment, the actuator element 11 comprises a shutter 18, configured to selectively interrupt or allow fluid communication between the second chamber 15 and the outlet opening 4; advantageously, the active element 12 of the actuator element 11 is connected to a shutter 18, and is configured to selectively lead the same to selectively interrupt or allow fluid communication between the second chamber 15 and the outlet opening 4, depending on the shape or dimensions of said active element 12, controlled by means of the electric current generator 13.

Preferably, in such an advantageous embodiment, the active element 12 is configured in such a way that in a rest condition it keeps the shutter 18 in such a position that does not allow fluid communication between the second chamber 15 and the outlet opening.

Also in this advantageous embodiment, the active element 12 can preferably be shaped as a torsion spring, more preferably as a helix, to whose free end the shutter 18 is fixed, and whose second end is constrained to the valve body 5. Also in this case, by operating on the electric current generator 13, a desired electric current can be sent to the active element 12, which heats up, changing its dimensions by a desired amount, and thus leading the shutter 18 respectively to interrupt or allow fluid communication between the second chamber 15 and the outlet opening 4.

The operation of the fluid-dynamic device according to the disclosure will be described below with reference to the three embodiments illustrated in the attached figures.

With reference to the first embodiment, illustrated in FIGS. 1 and 2, a fluid-dynamic device 1, implemented as a tubular body 1a, can be used for example as piping or tubing of a fluid-dynamic circuit, for example a hydraulic circuit, not illustrated.

A desired fluid, circulating in the fluid-dynamic circuit, can then be made to pass through the first chamber 2, entering the same through the inlet opening 3, and exiting through the outlet opening 4.

Depending on the value of the pressure of said fluid, the elastically deformable portion 6 of the chamber 2 elastically deforms by a certain amount; said deformation is detected by the sensor element 7, which transmits said information to the control unit 8; the control unit 8 can be advantageously configured to process the information received from the sensor element 7, and use it, for example, by interfacing with other possible components of the fluid-dynamic circuit, such as for example pumps, valves, etc., to adjust the flow rate of the fluid that is made to flow inside the first chamber 2, as a function of the detected pressure.

The elasticity of the portion 6 ensures that said portion 6 returns to its rest condition in the absence of fluid in the first chamber 2.

The use of a sensor element 7 consisting of or comprising a deposit 9 of functional material whose electrical properties vary according to its deformation, as described above and in particular realized according to the method described in the above-mentioned international application WO2011121017, guarantees an optimal detection even for high levels of deformation of the portion 6, and thus for high pressure values.

The deposit 9 of functional material in the elastomeric material of the elastically deformable portion 6 creates a conductive percolative path whose electrical impedance varies as the deformation of the portion 6 varies, even at very significant deformations. For example, the electrical functionality of the deposit 9 of functional material remains optimal even at elongations of up to 50% of the elastically deformable portion 6 functionalised with such a deposit.

With reference to the embodiment illustrated in FIGS. 3 and 4, in which the fluid-dynamic device 1 is implemented as a valve 1b, and the active element 12 is shaped as a torsion spring, preferably as a helix, constrained at a first end thereof to the outer face 14b of the membrane 14 and at a second end thereof to the valve body 5, said valve 1b may be inserted within a fluid-dynamic circuit, not illustrated, for example by connecting a first conduit of said circuit to the inlet opening 3, and a second conduit of said circuit to the outlet opening 4.

With the portion 6 (in this case the membrane 14) in a closed condition (FIG. 3), a fluid, schematised with an arrow 19, can be injected into the first chamber 2 through the inlet opening 3; however, this fluid cannot reach the outlet opening 4, as the passage is prevented by the membrane 14 in a closed condition.

In this condition, the membrane 14 is not deformed, and consequently the sensor element 7 can detect this deformation-free state and transmit this information to the control unit 8.

By operating on the actuator element 11, it is possible to bring the membrane 14 into an open condition (FIG. 4); for example, in an advantageous embodiment, by means of the current generator 13 it is possible to send a desired current to the active element 12, made of shape memory material, in such a way that the same causes the deformation of the membrane 14 until it allows the passage of the fluid 19 from the inlet opening 3 to the outlet opening 4.

Depending on the value of the pressure of the fluid 19 transiting in the first chamber 2, and on the value of the force exerted by the actuator element 11 on the membrane 14, the same deforms elastically by a certain amount; this deformation is detected by the sensor element 7, which transmits this information to the control unit 8; the control unit 8 can be advantageously configured to process the information received from the sensor element 7, and use it, possibly by interfacing with other components of the fluid-dynamic circuit, such as for example pumps, valves, etc., to control, preferably according to a closed-loop control logic, the actuator element 11, so as to dynamically adjust the degree of opening of the membrane 14, and therefore the flow rate of the valve 1b.

With reference to the embodiment illustrated in FIGS. 5 and 6, the fluid-dynamic device 1 is implemented as a valve 1b which comprises the second chamber 15 connected in parallel to the first chamber 2, and the elastically deformable portion 6 (the membrane 14) separates the second chamber 15 from the first chamber 2. Also in this case the valve 1b can be inserted into a fluid-dynamic circuit, not illustrated, for example by connecting a first conduit of said circuit to the inlet opening 3, and a second conduit of said circuit to the outlet opening 4.

With the valve 1b in the closed condition, illustrated in FIG. 5, a fluid 19 can be injected into the first chamber 2 and into the second chamber 15 through the inlet opening 3 (communicating with the second chamber through the injection opening 16.

In such a closed condition, the membrane 14 prevents the passage of the fluid 19 from the inlet opening 3 to the outlet opening 4, and the shutter 18 prevents the passage of the fluid from the second chamber 15 to the outlet opening 4.

In the embodiment illustrated in FIGS. 5 and 6, the valve 1b can be maintained in a closed condition by suitably controlling the current generated by the current generator 13 (e.g. by means of the control unit 8), in such a way that the active element 12 maintains the shutter 18 in a position such that fluid communication between the second chamber 15 and the outlet opening 4 is interrupted; for example, in such a condition, the current generator 13 may advantageously not deliver any current in the event that the active element 12 is configured in such a way that, in a rest condition, said active element 12 maintains the shutter 18 in a position such that fluid communication between the second chamber 15 and the outlet opening 4 is not allowed.

In this closed condition, the pressure of fluid 19 in the stretch of the first chamber 2 immediately downstream of the access opening 4 and in the second chamber 15 are equivalent, whereby the membrane 14, which divides the first chamber from the second chamber, is subjected to a zero pressure differential; the membrane 14 being configured in such a way that it remains in a closed condition when it is not subjected to external forces, it therefore remains in a closed condition, preventing the passage of fluid 19 from the inlet opening 3 to the outlet opening 4.

In this condition, the membrane 14 is not deformed, and consequently the sensor element 7 can detect this deformation-free state and transmit this information to the control unit 8.

In order to bring the membrane 14 into the open condition, and thus open the valve 1b, it is sufficient to actuate the actuator element 11 in such a way that it brings the shutter 18 into a position such that the passage of fluid from the second chamber 15 to the outlet opening 4, through the emission opening 17, is allowed; in such a condition, a pressure difference is generated between the fluid contained in the first chamber 2 and the fluid contained in the second chamber 15, which generates an opening force on the membrane 14, which deforms it, until it is brought into an open condition, so as to allow the passage of fluid 19 from the inlet opening 3 to the outlet opening 4, through the first chamber 2.

In this embodiment, the force generated by the change in shape of the active element 12 thus indirectly results in an elastic deformation of the elastically deformable portion 6 of the chamber 2.

Depending on the value of the pressure of the fluid 19 transiting in the first chamber 2, the membrane 14 deforms by a certain amount; this deformation is detected by the sensor element 7, which transmits this information to the control unit 8; the control unit 8 can be advantageously configured to process the information received from the sensor element 7, and use it, possibly by interfacing with any other components of the fluid-dynamic circuit, such as for example pumps, valves, etc., to control, preferably according to a closed-loop control logic, the actuator element 11, so as to dynamically adjust the degree of opening of the membrane 14, and therefore the flow rate of the valve 1b.

It has thus been found that the fluid-dynamic device with integrated sensor element according to the present disclosure achieves the task and purposes previously highlighted, since it is suitable for constituting or being easily integrated within a fluid-dynamic device or component (for example a tubing, a valve, etc.), allowing the latter to independently detect a quantity associated with a characteristic, for example the pressure, of the fluid contained therein or crossing it.

By comprising a sensor element directly associated with a portion of the first chamber within which a fluid is contained or flows, the fluid-dynamic device according to the present disclosure is inherently compact, and also makes it possible to reduce the overall dimension of a fluid-dynamic circuit to which the same is applied, with no need to use an additional dedicated pressure sensor associated with said circuit.

Furthermore, the fluid-dynamic device according to the present disclosure can be realized, in all its application forms, with relatively low costs.

In the advantageous embodiment in which the device according to the disclosure is a valve, the same allows, thanks to the possibility of directly monitoring a quantity (e.g. pressure) related to the fluid that crosses it, to dynamically control the degree of opening/closing of the valve, so as to optimally adapt to the characteristics (e.g. pressure or flow rate) of the fluid.

The use of a membrane as the closing member of the valve guarantees the quiet operation of the valve itself, together with reduced dimensions, and the possibility of handling high fluid flow rates.

The use of a sensor element consisting of or comprising a deposit of functional material, produced by the method described in International Patent Application WO2011121017, comprising nanoparticles consisting of a material selected from a metal, an oxide or another compound of a metal, deposited by implantation of nanometer-sized neutral aggregates on a surface of the elastomeric material constituting the elastomeric deformable portion, e.g., the valve membrane, ensures an optimal detection even for high levels of deformation of the elastomeric deformable portion (and thus, for example, for high pressure values). Moreover, this method described in International Patent Application WO2011121017 guarantees a high transduction factor, and allows to obtain nanoparticle deposits with a desired geometry and a desired electrical resistance, which are optimized for the specific applications, and possibly for the specific deformation ranges to be detected. This technology also allows to obtain a high reproducibility, and a high reliability of the sensor elements thus produced. In this way, all the drawbacks that affect, in general, the use of strain gauges, which have limited deformation ranges, are overcome and in fact are not suitable for use as sensors applicable to elastomeric materials. Furthermore, the application of strain gauges is often subject to delamination phenomena, which are absent in the solution according to the disclosure.

The device according to the disclosure, moreover, lends itself to being dimensionally compact and geometrically simple, and has masses that are relatively negligible and that have a low heat exchange coefficient, so as not to impact on the temperature of the fluid.

The use of shape memory materials in the actuator element allows considerable actuating forces to be exerted, while keeping the overall dimensions relatively small.

The fluid-dynamic device with integrated sensor element according to the present disclosure is susceptible in any case to numerous modifications and variations, all of which are within the same inventive concept; moreover, all the details can be replaced by technically equivalent elements. The materials used, as well as the shapes and dimensions, may in practice be of any type according to the technical requirements.

The invention claimed is:

1. A fluid-dynamic device with integrated sensor element comprising: a first chamber suitable for the containment and/or the passage of a fluid, provided with an inlet opening operatively connectable to a fluid-dynamic circuit and configured to allow a fluid to enter said first chamber, and with a separate outlet opening, operatively connectable to theta fluid-dynamic circuit and configured for the expulsion of said fluid from said first chamber, wherein said first chamber comprises at least one portion that is elastically deformable due to the action of the fluid contained therein and/or passing through said first chamber, to which a sensor element is associated which is sensitive to the deformation of said elastically deformable portion of said first chamber wherein said sensor element is connected/connectable to a control unit configured to detect a characteristic quantity of said sensor element dependent on the deformation of said elastically deformable portion of said first chamber, wherein said elastically deformable portion is or comprises an elastomeric material, wherein said sensor element is or comprises a deposit of functional material whose electrical properties vary based on its deformation, said deposit being electrically connected to electrical connectors for its connection to said control unit, wherein said deposit of functional material is or comprises a nanocomposite material comprising nanoparticles deposited by implantation of nanometer-sized neutral aggregates in said elastomeric material.

2. The fluid-dynamic device of claim 1, wherein said elastically deformable portion of said first chamber is configured to elastically modify its degree of deformation as a function of the pressure of the fluid contained or transiting in said first chamber.

3. The fluid-dynamic device of claim 1, wherein said fluid-dynamic device is a valve, and that said elastically deformable portion of said first chamber is configured to be elastically deformable between a closed condition, in which it prevents fluid communication between said inlet opening and said outlet opening, and an open condition, in which it allows fluid communication between said inlet opening and said outlet opening.

4. The fluid-dynamic device, as at claim 3, further comprises an actuator element configured to selectively bring said elastically deformable portion of said first chamber into said closed condition or into said open condition.

5. The fluid-dynamic device of claim 4, wherein said actuator element comprises an active element made of shape memory material and configured to selectively generate, depending on its shape and/or dimensions, a certain force which causes, directly or indirectly, a deformation of said elastically deformable portion of said first chamber, said actuator element comprising an electric current generating device operatively connected to said active element to selectively modify its shape and/or dimensions through a temperature variation induced by the passage of electric current inside said active element.

6. The fluid-dynamic device of claim 4, further comprising a second chamber connected in parallel to said first chamber by means of an injection opening in fluid communication with said inlet opening, and by an emission opening in fluid communication with said outlet opening, said elastically deformable portion separating said second chamber from said first chamber, said actuator element being configured to selectively interrupt or allow fluid communication between said second chamber and said outlet opening, so as, respectively, to equalize or reduce, the pressure of a fluid contained in said second chamber with respect to the pressure of a fluid contained in said first chamber.

7. The fluid-dynamic device of claim 3, wherein said elastically deformable portion of said first chamber is or comprises a membrane made of elastomeric material, with an inner face facing inwardly of said first chamber, and an outer face facing outwardly of said first chamber, said deposit of functional material being deposited on at least one of said inner face and outer face.

8. The fluid-dynamic device of claim 7, wherein said actuator element is operatively connected to said outer face of said membrane and is configured to selectively bring the latter into said closed condition or into said open condition.

9. A method for operating the fluid-dynamic device according to claim 1, the method includes the following steps:
  injecting a fluid from the fluid-dynamic circuit into said first chamber, through said inlet opening,
  detecting the deformation state of said elastically deformable portion of said first chamber through said sensor element, and
  transmitting from said sensor element to a control device a signal dependent on the deformation state of said portion.

10. The method of claim 9, wherein the fluid-dynamic device controls said actuator element to selectively bring said elastically deformable portion of said first chamber into said closed condition or into said open condition, based on the detection of said sensor element.

11. A fluid-dynamic device with integrated sensor element comprising: a first chamber suitable for the containment and/or the passage of a fluid, provided with an inlet opening operatively connectable to a fluid-dynamic circuit and configured to allow a fluid to enter said first chamber, and with a separate outlet opening, operatively connectable to the fluid-dynamic circuit and configured for the expulsion of said fluid from said first chamber, wherein said first chamber comprises at least one portion that is elastically deformable due to the action of the fluid contained therein and/or passing through said first chamber, to which a sensor element is associated which is sensitive to the deformation of said elastically deformable portion of said first chamber, wherein said sensor element is connected/connectable to a control unit configured to detect a characteristic quantity of said sensor element dependent on the deformation of said elastically deformable portion of said first chamber, wherein said elastically deformable portion is or comprises an elastomeric material, wherein said sensor element is or comprises a deposit of functional material whose electrical properties vary based on its deformation, said deposit being electrically connected to electrical connectors for its connection to said control unit, wherein said deposit of functional material is defined by a dispersion of nanoparticles comprising a metal or an oxide or another compound of a metal, in a matrix of said elastomeric material.

12. The fluid-dynamic device of claim 11, wherein said elastically deformable portion of said first chamber is configured to elastically modify its degree of deformation as a function of the pressure of the fluid contained or transiting in said first chamber.

13. The fluid-dynamic device of claim 11, wherein said fluid-dynamic device is a valve, and that said elastically deformable portion of said first chamber is configured to be elastically deformable between a closed condition, in which it prevents fluid communication between said inlet opening and said outlet opening, and an open condition, in which it allows fluid communication between said inlet opening and said outlet opening.

14. The fluid-dynamic device, as at claim 13, further comprises an actuator element configured to selectively bring said elastically deformable portion of said first chamber into said closed condition or into said open condition.

15. The fluid-dynamic device of claim 14, wherein said actuator element comprises an active element made of shape memory material and configured to selectively generate, depending on its shape and/or dimensions, a certain force which causes, directly or indirectly, a deformation of said elastically deformable portion of said first chamber, said actuator element comprising an electric current generating device operatively connected to said active element to selectively modify its shape and/or dimensions through a temperature variation induced by the passage of electric current inside said active element.

16. The fluid-dynamic device of claim 14, further comprising a second chamber connected in parallel to said first chamber by means of an injection opening in fluid communication with said inlet opening, and by an emission opening in fluid communication with said outlet opening, said elastically deformable portion separating said second chamber from said first chamber, said actuator element being configured to selectively interrupt or allow fluid communication between said second chamber and said outlet opening, so as, respectively, to equalize or reduce, the pressure of a fluid contained in said second chamber with respect to the pressure of a fluid contained in said first chamber.

17. The fluid-dynamic device of claim 13, wherein said elastically deformable portion of said first chamber is or comprises a membrane made of elastomeric material, with an inner face facing inwardly of said first chamber, and an outer face facing outwardly of said first chamber, said deposit of functional material being deposited on at least one of said inner face and outer face.

18. The fluid-dynamic device of claim 17, wherein said actuator element is operatively connected to said outer face of said membrane and is configured to selectively bring the latter into said closed condition or into said open condition.

19. A method for operating the fluid-dynamic device according to claim 11, the method includes the following steps:
  injecting a fluid from the fluid-dynamic circuit into said first chamber, through said inlet opening, detecting the deformation state of said elastically deformable portion of said first chamber through said sensor element, and transmitting from said sensor element to a control device a signal dependent on the deformation state of said portion.

20. The method of claim 19, wherein the fluid-dynamic device controls said actuator element to selectively bring said elastically deformable portion of said first chamber into said closed condition or into said open condition, based on the detection of said sensor element.

\* \* \* \* \*